United States Patent
Menon et al.

(10) Patent No.: US 11,784,917 B2
(45) Date of Patent: *Oct. 10, 2023

(54) LAYER-2 NETWORK EXTENSION OVER LAYER-3 NETWORK USING ENCAPSULATION

(71) Applicant: Juniper Networks, Inc., Sunnyvale, CA (US)

(72) Inventors: Abilash Menon, Boxborough, MA (US); Anna Yungelson, Lexington, MA (US); Scott A. McCulley, Burlington, MA (US); Jacob Dionne, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,492

(22) Filed: Sep. 15, 2022

(65) Prior Publication Data
US 2023/0008913 A1    Jan. 12, 2023

Related U.S. Application Data

(63) Continuation of application No. 17/357,763, filed on Jun. 24, 2021, now Pat. No. 11,477,115.
(Continued)

(51) Int. Cl.
*G06F 15/16* (2006.01)
*H04L 45/24* (2022.01)
(Continued)

(52) U.S. Cl.
CPC .......... *H04L 45/24* (2013.01); *H04L 12/4641* (2013.01); *H04L 45/16* (2013.01);
(Continued)

(58) Field of Classification Search
CPC ... H04L 12/4641; H04L 45/66; H04L 61/103; H04L 67/146
See application file for complete search history.

(56) References Cited

U.S. PATENT DOCUMENTS 8,576,844 B1    11/2013 Ghosh
9,124,529 B1 *  9/2015 Chadha ................ H05K 999/99
(Continued)

FOREIGN PATENT DOCUMENTS

EP          3198822 A1    8/2017

OTHER PUBLICATIONS

International Preliminary Report on Patentability from International Application No. PCT/US2021/038988 dated Jan. 5, 2023, 8 pp.
(Continued)

*Primary Examiner* — Hieu T Hoang
(74) *Attorney, Agent, or Firm* — Shumaker & Sieffert, P.A.

(57) ABSTRACT

Techniques are disclosed for session-based routing within Open Systems Interconnection (OSI) Model Layer-2 (L2) networks extended over Layer-3 (L3) networks. In one example, L2 networks connect a first client device to a first router and a second client device to a second router. An L3 network connects the first and second routers. The first router receives, from the first client device, an non-session-based L2 frame destined for the second client device. The first router forms an L3 packet comprising an L3 header specifying L3 addresses of the first and second routers and a protocol selected based on an L3 service for the L2 frame, a payload comprising the L2 frame, and metadata comprising a session identifier distinctly identifying the L2 frame, and forwards the L3 packet to the second router. The second router recovers the L2 frame from the payload and forwards the L2 frame to the second client device.

20 Claims, 5 Drawing Sheets

Related U.S. Application Data

(60) Provisional application No. 63/043,423, filed on Jun. 24, 2020, provisional application No. 63/043,426, filed on Jun. 24, 2020, provisional application No. 63/043,416, filed on Jun. 24, 2020.

(51) Int. Cl.

| | | |
|---|---|---|
| *H04L 45/00* | (2022.01) | |
| *H04L 67/146* | (2022.01) | |
| *H04L 12/46* | (2006.01) | |
| *H04L 45/42* | (2022.01) | |
| *H04L 45/745* | (2022.01) | |
| *H04L 45/16* | (2022.01) | |
| *H04L 61/103* | (2022.01) | |
| *H04L 101/622* | (2022.01) | |

(52) U.S. Cl.
CPC .............. *H04L 45/42* (2013.01); *H04L 45/66* (2013.01); *H04L 45/745* (2013.01); *H04L 61/103* (2013.01); *H04L 67/146* (2013.01); *H04L 2101/622* (2022.05)

(56) References Cited

U.S. PATENT DOCUMENTS

| | | | |
|---|---|---|---|
| 9,729,439 | B2 | 8/2017 | MeLampy et al. |
| 9,729,682 | B2 | 8/2017 | Kumar et al. |
| 9,762,485 | B2* | 9/2017 | Kaplan .................. H04L 49/30 |
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 11,075,824 | B2 | 7/2021 | McCulley et al. |
| 11,165,863 | B1 | 11/2021 | Timmons et al. |
| 2003/0133450 | A1 | 7/2003 | Baum |
| 2003/0154297 | A1* | 8/2003 | Suzuki .................. H04L 69/168 |
| | | | 709/229 |
| 2009/0003354 | A1* | 1/2009 | Sreejith ................. H04L 49/355 |
| | | | 370/396 |
| 2010/0132028 | A1* | 5/2010 | Wang .................. H04L 63/0236 |
| | | | 726/11 |
| 2011/0058544 | A1* | 3/2011 | Sardesai ............. H04L 65/1104 |
| | | | 709/227 |
| 2013/0107725 | A1 | 5/2013 | Jeng et al. |
| 2014/0195666 | A1 | 7/2014 | Dumitriu et al. |
| 2014/0280813 | A1* | 9/2014 | Ramachandran ....... H04L 67/14 |
| | | | 709/223 |
| 2016/0226762 | A1 | 8/2016 | Zhang et al. |
| 2017/0093636 | A1 | 3/2017 | Chanda et al. |
| 2017/0339046 | A1 | 11/2017 | Gast et al. |
| 2018/0278514 | A1* | 9/2018 | Chadha .................. H04L 43/10 |
| 2018/0343196 | A1 | 11/2018 | Baj et al. |
| 2020/0012737 | A1* | 1/2020 | Rayaroth Koderi ........................ G06F 16/2255 |
| 2020/0314016 | A1 | 10/2020 | Dutta |
| 2020/0366589 | A1 | 11/2020 | Kaplan et al. |
| 2020/0366590 | A1 | 11/2020 | Kaplan et al. |
| 2020/0366598 | A1 | 11/2020 | Kaplan et al. |
| 2020/0366599 | A1 | 11/2020 | Kaplan et al. |
| 2020/0403890 | A1 | 12/2020 | McCulley et al. |
| 2021/0211324 | A1 | 7/2021 | Dutta |
| 2021/0226912 | A1* | 7/2021 | Ranpise ............. H04L 12/4633 |
| 2021/0243111 | A1 | 8/2021 | Dutta |
| 2021/0409323 | A1 | 12/2021 | Menon et al. |
| 2022/0200915 | A1 | 6/2022 | Timmons |
| 2023/0009482 | A1 | 1/2023 | Menon et al. |

OTHER PUBLICATIONS

Juniper Networks EVPN Implementation for Next-Generation Data Center Architectures, Juniper Networks; White Paper, Jul. 2015, 62 pp.

"Transmission Control Protocol," DARPA Internet Program Protocol Specification, Information Sciences Institute, RFC 793, Sep. 1981, 91 pp.

Hao et al., "TRILL Integrated Routing and Bridging Solution; draft-hao-trill-irb-02.txt," Internet Draft, Jul. 12, 2013, 10 pp.

International Search Report and Written Opinion of International Application No. PCT/US2021/038988, dated Oct. 18, 2021, 15 pp.

Notice of Allowance from U.S. Appl. No. 17/357,763, dated Jun. 15, 2022, 11 pp.

Postel,"User Datagram Protocol," RFC 768, Aug. 28, 1980, 3 pp.

Sajassi et al., "Integrated Routing and Bridging in EVPN, draft-ietf-bess-evpn-inter-subnet-forwarding-01," Internet-Draft, L2VPN Workgroup, Oct. 18, 2015, 26 pp.

U.S. Appl. No. 17/357,743, filed Jun. 24, 2021, naming inventors Menon et al.

U.S. Appl. No. 17/357,763, filed Jun. 24, 2021, naming inventors Menon et al.

U.S. Appl. No. 17/357,790, filed Jun. 24, 2021, naming inventors Menon et al.

Response to Communication Pursuant to Rules 161(1) and 162 EPC dated Feb. 15, 2023, from counterpart European Application No. 21745534.4, filed Aug. 15, 2023, 33 pp.

* cited by examiner

LAYER-2 NETWORK EXTENSION OVER LAYER-3 NETWORK USING ENCAPSULATION

This application is a continuation of U.S. patent application Ser. No. 17/357,763, filed Jun. 24, 2021, which claims the benefit of U.S. Provisional Application No. 63/043,416, filed on Jun. 24, 2020, U.S. Provisional Application No. 63/043,426, filed on Jun. 24, 2020, and U.S. Provisional Application No. 63/043,423, filed on Jun. 24, 2020, the entire content of each of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for performing session-based routing of non-session-based L2 frames for L2 networks extended over Layer-3 networks. In one example, a first L2 network connects a first client device to a first router, a second L2 network connects a second client device to a second router, and an L3 network connects the first router to the second router. Typically, the first router and second router may provide session-based routing. For example, the first router receives, from the first client device, a session-based L2 frame destined for the second client device. The session-based L2 frame includes an L2 header and a payload, where the L2 header specifies a source Media Access Control (MAC) address of the first client device and a destination MAC address of the second client device. The first router may use the source and destination MAC addresses to identify a session for the session-based L2 frame that comprises a forward packet flow originating from the first client device and destined for the second client device and a reverse packet flow originating from the second client device and destined for the first client device. The first router may therefore perform a stateful, session-based routing scheme that enables the first router to independently perform path selection and traffic engineering for each distinct "session" of packets serviced by the first router.

Typical routers may be unable to apply such stateful, session-based routing to non-session-based L2 frames because such non-session-based L2 frames typically do not correspond to a session, e.g., are not part of a communication session comprising a forward and reverse packet flow between two devices. For example, a non-session-based payload may comprise an Address Resolution Protocol (ARP) request, a Cisco Discovery Protocol (CDP) request, or a Link Layer Discovery Protocol (LLDP) request. To apply session-based routing to a non-session-based L2 frame, a first router as described herein may generate a placeholder session identifier for the non-session-based L2 frame that routers of the L3 network may use to distinctly identify the non-session-based L2 frame from other L2 frames and perform session-based routing of the non-session-based L2 frame.

As an example, the first router receives, from the first client device, an L2 frame destined for the second client device. In response to receiving the L2 frame, the first router determines whether the L2 frame comprises a non-session-based payload. In response to determining that the L2 frame comprises a non-session-based payload, the first router generates a placeholder session identifier for the L2 frame. The placeholder session identifier comprises, for example, a placeholder source IP address, a placeholder source port, a placeholder destination IP address, a placeholder destination port, and a placeholder network protocol. The first router generates an L3 packet which encapsulates the L2 frame such that the L3 packet comprises, for example, an L3 header, a payload comprising the L2 frame, and metadata specifying the placeholder session identifier. In some examples, the L3 header comprises a source Internet Protocol (IP) address and a source port of the first router, a destination IP address and a destination port of the second router, and a network protocol. The first router identifies an L3 network service associated with the L2 frame, and selects the network protocol of the L3 header based on the identified L3 network service associated with the L2 frame from a plurality of network protocols. The first router forwards, via the L3 network and toward the second router, the L3 packet with the encapsulated L2 frame. Therefore, first router may use the placeholder session identifier as a fabricated, unique session-identifying 5-tuple so that, even where the L2 frame does not include unique session-identifying information, the first router may nevertheless establish a stateful routing session for the non-session-based L2 frame across an L3 network. The second router receives the L3 packet and obtains, from the payload of the L3 packet, the L2 frame. The second router forwards, via the second L2 network, the recovered L2 frame to the second client device.

In some examples, the first router uses the generated placeholder session identifier to identify a unidirectional session for the L3 packet, the unidirectional session comprising a forward flow originating from the first client device and destined for the second client device but not a reverse flow originating from the second client device and destined for the first client device. In some examples, the unidirectional session comprises a forward UDP packet flow originating from the first client device and destined for the second client device but not a reverse UDP packet flow originating from the second client device and destined for the first client device. The first router may use this placeholder session identifier to perform session-based routing of the L3 packet across the L3 network.

The techniques of the disclosure may provide specific improvements to the computer-related field of computer networking that have practical applications. For example, the techniques of the disclosure may enable routers of an L3 network to perform L3 session-based routing of L2 frames, even where the L2 frames carry non-session-based payloads which ordinarily do not correspond to a session and therefore conventionally may not be identified with a session identifier. Further, the techniques disclosed herein may enable the extension of an L2 network across an L3 network, even for L2 frames that include non-session-based payloads. For example, the use of encapsulation to carry L2 frames and the generation of a placeholder session identifier for non-session-based L2 frames, may enable routers of an L3 network to distinctly identify a non-session-based L2 frame from other L2 frames such that L3 session-based routing, traffic engineering, failover operations, and stateful services may be applied to the L2 frame. Therefore, the techniques of the disclosure may improve the reliability and redundancy of L2 frames that are carried across an L3 network, even where the L2 frames carry non-session-based payloads.

In one example, this disclosure describes a method comprising: receiving, by a first router and from a first client device connected to the first router via a first Open Systems Interconnection (OSI) Model Layer-2 (L2) network, an L2 frame destined for a second client device, the L2 frame comprising an L2 header and a non-session-based payload, wherein the first router is connected to a second router via an OSI Model Layer-3 (L3) network, and wherein the second router is connected to the second client device via a second L2 network; identifying, by the first router and based on the L2 header of the L2 frame, an L3 network service associated with the L2 frame; generating, by the first router and in response to determining the L2 frame comprises the non-session-based payload, a placeholder session identifier for the L2 frame, wherein the placeholder session identifier comprises a placeholder source IP address, a placeholder source port, a placeholder destination IP address, a placeholder destination port, and a first network protocol; forming, by the first router, an L3 packet comprising: an L3 header, wherein the L3 header comprises a source IP address and a source port of the first router, a destination IP address and a destination port of the second router, and a second network protocol, the second network protocol selected based on the identified L3 network service associated with the L2 frame from a plurality of network protocols; a payload comprising the L2 frame; and metadata comprising the placeholder session identifier; and performing, by the first router and based on the placeholder session identifier, L3 session-based routing of the L3 packet to forward the L3 packet via the L3 network to the second router.

In another example, this disclosure describes a first router comprising processing circuitry configured to: receive, from a first client device connected to the first router via a first Open Systems Interconnection (OSI) Model Layer-2 (L2) network, an L2 frame destined for a second client device, the L2 frame comprising an L2 header and a non-session-based payload, wherein the first router is connected to a second router via an OSI Model Layer-3 (L3) network, and wherein the second router is connected to the second client device via a second L2 network; identify, based on the L2 header of the L2 frame, an L3 network service associated with the L2 frame; generate, in response to determining the L2 frame comprises the non-session-based payload, a placeholder session identifier for the L2 frame, wherein the placeholder session identifier comprises a placeholder source IP address, a placeholder source port, a placeholder destination IP address, a placeholder destination port, and a first network protocol; form an L3 packet comprising: an L3 header, wherein the L3 header comprises a source IP address and a source port of the first router, a destination IP address and a destination port of the second router, and a second network protocol, the second network protocol selected based on the identified L3 network service associated with the L2 frame from a plurality of network protocols; a payload comprising the L2 frame; and metadata comprising the placeholder session identifier; and perform, based on the placeholder session identifier, L3 session-based routing of the L3 packet to forward the L3 packet via the L3 network to the second router.

In another example, this disclosure describes a method comprising: receiving, by a second router and from a first router connected to the second router via an Open Systems Interconnection (OSI) Model Layer-3 (L3) network, an L3 packet, wherein the first router is connected to a first client device via a first OSI Model Layer-2 (L2) network and the second router is connected to a second client device via a second L2 network, and wherein the L3 packet comprises: an L3 header comprising a source IP address and a source port of the first router, a destination IP address and a destination port of the second router, and a first network protocol; a payload comprising an L2 frame originated by the first client device and destined for the second client device, the L2 frame comprising a non-session-based payload; and metadata comprising a placeholder session identifier for the L2 frame, wherein the placeholder session identifier comprises a placeholder source IP address, a placeholder source port, a placeholder destination IP address, a placeholder destination port, and a second network protocol; obtaining, by the second router and from the payload of the L3 packet, the L2 frame; and forwarding, by the second router and to the second client device via the second L2 network, the L2 frame.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
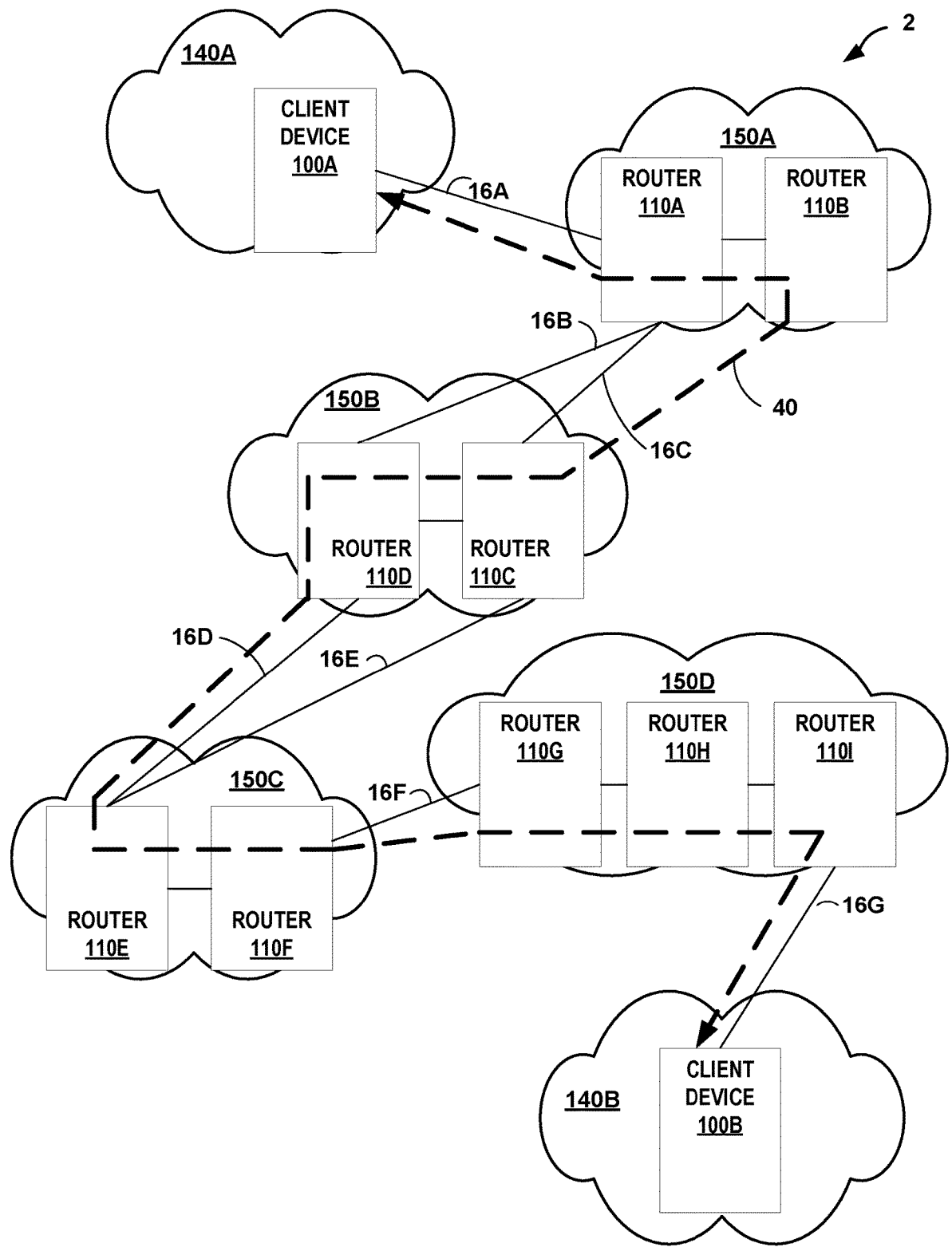
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network WAN) connectivity to disparate customer networks 140A-140B ("customer networks 140"). Routers 110A-110I (collectively, "routers 110") of service provider networks 150 provide client devices 100A-100B (collectively, "client devices 100") associated with customer networks 140 with access to service provider networks 150. In some examples, customer networks 140 are enterprise networks. For ease of illustration, customer network 140A is depicted as having a single client device 100A and customer network 140B is depicted as having a single client device 100B, but each of customer networks 140 may have any number of client devices. As depicted in the example of FIG. 1, customer networks 140 are L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16G (collectively, links "16") may be Ethernet, ATM or any other suitable network connections.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as IP. L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100A of system 2 establishes session 40 with client device 100B. Routers 110 facilitate establishment of session 40 by transporting network traffic between client device 100A and client device 100B. In some examples, client device 100A may be considered a "source" device in that client device 100A originates sessions 40 between client device 100A and client device 100B, e.g., client device 100A is the "source" of a first packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, routers 110A-110I, and client device 100B. As described in more detail below, routers 110 enable the extension of customer network 140A, an L2 network, across service provider networks 150, e.g., L3 networks, to customer network 140B, another L2 network.

Client device 100A may establish session 40 with client device 100B according to one or more L2 communication session protocols, including Ethernet. As described in more detail below, customer network 140A may form a first L2 network and customer network 140B may form a second L2 network. Routers 110 operate to extend customer network 140A across service provider networks 150, which are one or more L3 networks, to customer network 140B. In this fashion, customer network 140A and customer network 140B may operate as if they were both part of the same L2 network, even though customer network 140A and customer network 140B may be logically isolated and geographically separate from one another. Furthermore, routers 110 may operate such that the existence of service provider networks 150 between customer network 140A and customer network 140B is transparent to client devices 100.

In some examples, routers 110 may extend session 40 as an L3 session across service provider networks 150 according to one or more L3 communication session protocols, including TCP or UDP, etc. For example, to establish session 40 according to TCP such that data may be exchanged according to TCP, router 110A and router 110B perform a three-way handshake. Router 110A sends a first packet comprising a "SYN" flag to router 110B. Router 110B acknowledges receipt of the first packet by responding to router 110A with a second packet comprising a "SYN-ACK" flag. Router 110A acknowledges receipt of the second packet by responding to router 110B with a third packet comprising an "ACK" flag. After sending the third packet, session 40 is established according to TCP and routers 110A, 110B may exchange data with one another (e.g., by transporting L2 data between client device 100A and client device 100B) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that router 110A does not verify that router 110B is capable of receiving data prior to transmitting data. To establish session 40 according to UDP, router 110A transmits a first packet to router 110B. Session 40 may be considered "established" according to UDP upon receipt by router 110A of any packet from router 110B, which implies that router 110B successfully received the first packet from router 110A, responded, and router 110A was able to receive the response from router 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1, a stateful routing session may be established from ingress router 110A through intermediate routers 110B-110H to egress router 110I. In this example, router 110A determines that the first packet is an unmodified packet and the first packet of new session 40. Router 110A modifies the first packet to include metadata specifying the session identifier (e.g., the original source address, source port, destination address, and destination port). Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110B. Additionally, router 110A stores the session identifier for session 40 such that, upon receiving subsequent packets for session 40, router 110A may identify the subsequent packets as belonging to the same session 40 and forward the subsequent packets along the same path as the first packet.

Intermediate router 110B receives the modified first packet and determines whether the modified first packet includes metadata specifying the session identifier. In response to determining that the modified first packet includes metadata specifying the session identifier, intermediate router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 100B, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110I is a terminus router because router 110I may forward packets to client device 100B. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., client device 100B). Router 110I recovers the original first packet by removing the metadata from the modified first packet and using the metadata to modify the header of the first packet to specify the original source address, source port, destination address, and destination port. Router 110I forwards the recovered first packet to client device 100B. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to a central repository, e.g., a server. Further, each router 110 may receive service and topology state information for each other router 110 in system 2 from the central repository.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and 110B within service provider network 150A may maintain service and topology state information only for one another, and not for routers 110C-110I. Similarly, each router 110D and 110C within service provider network 150B may maintain service and topology state information only for one another, and not for routers 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Layer-2 Network Extension Over Layer-3 Network Using Encapsulation

In accordance with the techniques of the disclosure, computer network system 2 performs session-based routing of non-session-based L2 frames of L2 customer networks 140 extended over L3 service provider networks 150. In one example, L2 customer network 140A connects client device 100A to router 110A, L2 customer network 140B connects client device 100B to router 110I, and L3 service provider networks 150 connect router 110A to router 110I via routers 110B-110H. Router 110A receives, from client device 100A, an L2 frame including an L2 header and a payload. In some examples, the L2 header comprises a source Media Access Control (MAC) address of client 100A and a destination MAC address of client 100B. In some examples, the L2 frame comprises an Ethernet frame.

In response to receiving the L2 frame, router 110A generates an L3 packet which encapsulates the L2 frame such that the L3 packet comprises an L3 header, a payload comprising the L2 frame, and metadata specifying a placeholder session identifier for the L2 frame. The L3 header specifies a 5-tuple comprising a source IP address and a source port of router 110A, a destination IP address and a destination port of a next-hop router 110 (e.g., router 110B), and a network protocol. In some examples, router 110A identifies an L3 network service associated with the L2 frame, and selects the network protocol of the L3 header based on the identified L3 network service associated with the L2 frame from a plurality of network protocols. In some examples, the L3 packet is a UDP packet and the network protocol is UDP. In other examples, the L3 packet is a TCP packet and the network protocol is TCP.

To perform session-based routing of the non-session-based L2 frame, router 110A generates a placeholder session identifier for the L2 frame. As discussed above, routers 110 may use a session identifier to identify a bidirectional session. Typically, a "session" comprises a forward flow originating from a first device and destined for a second device and a reverse flow originating from the second device and destined for the first device. The session identifier typically is a 5-tuple comprising a source IP address and port of the client device originating the session, a destination IP address and port of the destination client device, and a network protocol used by the session. This 5-tuple may be specified in an L3 header of an L3 packet received from the originating client device, or obtained from an L3 address translation of an L2 header of an L2 frame received from the originating client device. Routers 110 may use this session identifier to perform session-based routing of the L3 packet across the L3 network.

However, in some examples, router 110A may receive a non-session-based L2 frame. The non-session-based L2 frame includes an L2 header and a non-session-based payload. In some examples, the non-session-based payload of the L2 frame comprises an ARP request, a CDP request, or an LLDP request. For example, client 100A may use ARP request to query an unknown MAC address for, e.g., client device 100B. In such an example, an L2 frame including the ARP request as a payload may not include a destination MAC address for client device 100B because such information may not be known. Thus, an L2 frame that comprises a non-session-based payload, such as an ARP request, does not involve a bidirectional session comprising forward and reverse packet flows between two devices, and therefore may not include the L2 or L3 addressing information for both an originating device and a destination device. Therefore, a conventional router may be unable to identify a "session" for a non-session-based L2 frame so as to perform L3 session-based routing services to the L2 frame, such as route failover, stateful packet services and deep packet inspection, etc.

In accordance with the techniques of the disclosure, router 110A determines whether the L2 frame comprises a non-session-based payload. In response to determining that the L2 frame comprises a non-session-based payload, router 110A generates a "placeholder" session identifier for the L3 packet to enable routers 110 of the L3 network to perform L3 session-based routing of the non-session-based L2 frames. The placeholder session identifier of the metadata of the L3 packet comprises, for example, a 5-tuple comprising a placeholder source IP address, a placeholder source port, a placeholder destination IP address, a placeholder destination port, and a first network protocol. In some examples, the placeholder source IP address is an IP address of a Local Area Network (LAN) interface with which router 110A receives the L2 frame and the placeholder source port is a port of the LAN interface with which router 110A receives the L2 frame. In some examples, the placeholder destination IP address is an IP address of a LAN interface of a next-hop router 110 (e.g., router 110B) to which router 110A forwards the L3 packet and the placeholder destination port is a port of the LAN interface of the next-hop router 110 (e.g., router 110B) to which router 110A forwards the L3 packet. In some examples, the network protocol is UDP, TCP, or other communication session protocols.

Because the non-session-based L2 frame does not include the L2 or L3 addressing information for both an originating device and a destination device, the placeholder session identifier generated by router 110A for the L2 frame may comprise, for example, a 5-tuple that may not correspond to either the 5-tuple of the L3 packet header or an L3 address translation of the L2 header of the L2 frame. In other words, unlike a session identifier for a session-based L2 or L3 packet, the placeholder session identifier for the non-session-based L2 frame may not necessarily correspond to an actual address of the source or destination of the L2 frame and may be arbitrary.

Accordingly, router 110A (and the other routers 110 of L3 service provider networks 150) may use the placeholder session identifier to differentiate the L2 frame from other L2 frames such that router 110A may perform session-based routing of the L3 packet encapsulating the L2 frame, even where the L2 frame comprises a non-session-based payload. Each router 110 may use the placeholder session identifier to provide stateful, L3 session-based routing services to the L3 packet encapsulating the L2 frame, and therefore, effectively provide such stateful, L3 session-based routing services to the L2 frame. For example, each router 110 may provide a path failover service to select a new path for routing the L3 packet encapsulating the L2 frame in the event of a failure of one of links 16. Additionally, each router 110 may provide priority routing services to apply a priority to the L3 packet encapsulating the L2 frame and route the L3 packet across service provider network 150 according to the priority. Additionally, each router 110 may provide packet-based, flow-based, or session-based metrics to the L3 packet encapsulating the L2 frame so as to ensure adherence to Software License Agreements (SLAs) when routing the L3 packet encapsulating the L2 frame.

Router 110A forwards, via L3 service provider network 150A, and to router 110B (e.g., the next-hop router 110), the L3 packet which encapsulates the non-session-based L2 frame. Furthermore, router 110A stores the placeholder session identifier and an indication of the next-hop router (e.g., router 110B) in a table of session information. As described above, because routers 110 perform session-based routing, each router 110 replaces the L3 header with a source IP address and a source port of the current router 110 and a destination IP address and a destination port of the next-hop router 110. Additionally, each router 110 stores the placeholder session identifier and an indication of the next-hop router. For example, router 110B may replace the L3 header of the L3 packet with a new L3 header that specifies a source IP address and a source port of router 110B and a destination IP address and destination port of router 110C before forwarding the L3 packet to router 110C. Router 110B further stores the placeholder session identifier and an indication of the next-hop router (e.g., router 110C) in a table of session information. Router 110C, in turn, may replace the L3 header of the L3 packet with yet another new L3 header that specifies a source IP address and a source port of router 110C and a destination IP address and destination port of router 110D before forwarding the L3 packet to router 110D. Router 110C further stores the placeholder session identifier and an indication of the next-hop router (e.g., router 110D) in a table of session information. Each router 110 may perform these steps until router 110I receives the L3 packet. Router 110I decapsulates the L3 packet so as to recover the L2 frame from the payload of the L3 packet. Router 110I may thereafter forward, via L2 customer network 140B, the recovered L2 frame to client device 100B.

In the foregoing example, the placeholder session identifier may represent a unidirectional session for the L3 packet, the unidirectional session comprising a forward flow originating from client device 110A and destined for client device 100B, but not a reverse flow originating from client device 100B and destined for client device 100A. In some examples, the unidirectional session comprises a forward UDP packet flow originating from client device 110A and destined for client device 100B but not a reverse UDP packet flow originating from client device 100B and destined for client device 100A. This is in contrast to the typical use of a session identifier that may be used for L2 and/or L3 session-based packets, for which the session identifier identifies a bidirectional session that comprises both the forward flow and the reverse flow. Accordingly, routers 110 may use the metadata comprising the placeholder session identifier of the L3 packet to perform L3 session-based routing of the L2 frame (encapsulated by the L3 packet) across L3 service provider networks 150 and apply stateful routing services to the L2 frame as described herein.

Accordingly, the techniques of the disclosure may enable routers of an L3 network to perform L3 session-based routing of L2 frames, even where the L2 frames carry non-session-based payloads which ordinarily do not correspond to a session and therefore conventionally may not be identified with a session identifier. For example, the techniques of the disclosure may be used to encapsulate non-session-based L2 frames with L3 UDP packets such that an L3 network may treat the non-session-based L2 frames as L3 UDP packets and apply session-based routing techniques to such L3 UDP packets (or similarly with TCP packets). Further, the techniques disclosed herein may enable the extension of an L2 network across an L3 network, even for L2 frames that include non-session-based payloads. For example, the use of encapsulation to carry L2 frames and the generation of a placeholder session identifier for non-session-based L2 frames, may enable routers of an L3 network to distinctly identify a non-session-based L2 frame from other L2 frames such that L3 session-based routing, traffic engineering, failover operations, and stateful services may be applied to the L2 frame. Therefore, the techniques of the disclosure may improve the reliability and redundancy of L2 frames that are carried across an L3 network, even where the L2 frames carry non-session-based payloads.

In some examples, routers 110 may perform session-based routing of session-based L2 frames extended over Layer-3 networks using L2 metadata. Additional information with respect to performing session-based routing of session-based L2 frames extended over Layer-3 networks using L2 metadata is set forth in U.S. patent application Ser. No. 17/357,790, entitled "LAYER-2 NETWORK EXTENSION OVER LAYER-3 NETWORK USING LAYER-2 METADATA," filed on Jun. 24, 2021, the entire content of which is incorporated herein by reference in its entirety.

In some examples, routers 110 may perform session-based routing of point-to-multipoint L2 frames extended over Layer-3 networks. Additional information with respect to performing session-based routing of point-to-multipoint L2 frames extended over Layer-3 networks is set forth in U.S. patent application Ser. No. 17/357,743, entitled "POINT-TO-MULTIPOINT LAYER-2 NETWORK EXTENSION OVER LAYER-3 NETWORK," filed on Jun. 24, 2021, the entire content of which is incorporated herein by reference in its entirety.

Figure 2:
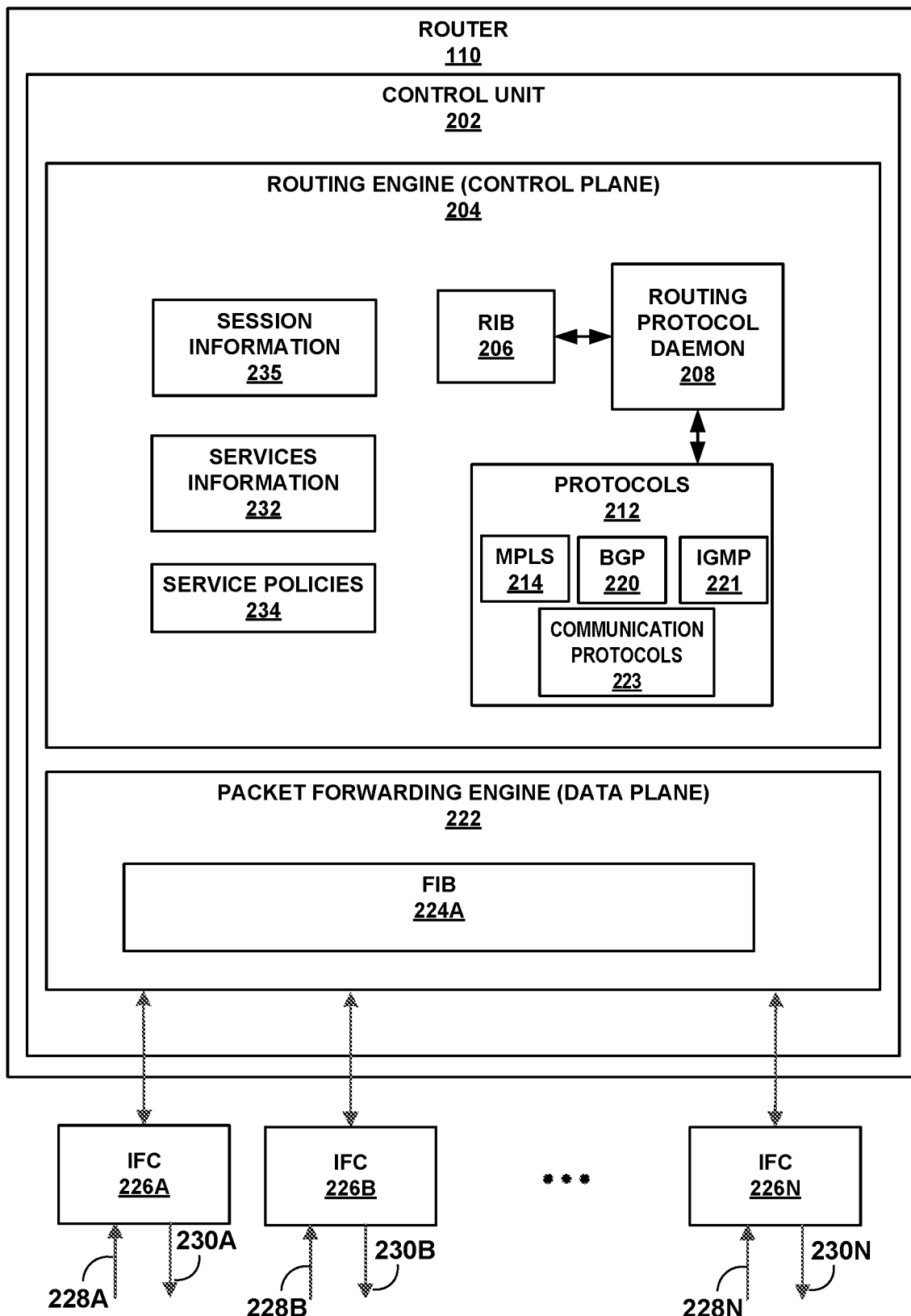
FIG. 2 is a block diagram illustrating an example router in accordance with the techniques of the disclosure.

FIG. 2 is a block diagram illustrating an example router 110 in accordance with the techniques of the disclosure. In general, router 110 may be an example of one of routers 110 of FIG. 1. In this example, router 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIG. 1, to establish and maintain a computer network, such as computer network system 2 of FIG. 1, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols, such as TCP, UDP, TLS, or ICMP.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100A and destined for client device 100B of FIG. 1, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In accordance with the techniques of the disclosure, router 110 performs session-based routing of non-session-based L2 frame of L2 customer networks 140 extended over L3 service provider networks 150 of FIG. 1. Router 110 may operate as any of routers 110 of FIG. 1.

With reference to FIG. 1, in the following example, router 110 operates as router 110A. Control unit 202 receives, via IFCs 226, a non-session-based L2 frame from client device 100A. The L2 frame includes an L2 header and a non-session-based payload. In some examples, the non-session-based payload of the L2 frame comprises an ARP request, a CDP request, or an LLDP request. In some examples, the L2 frame comprises an Ethernet frame. Control unit 202 examines the payload in the L2 frame and determines the L2 frame comprises a non-session-based payload (e.g., ARP request, CDP request, or LLDP request).

In response to determining that the L2 frame includes a non-session-based payload, control unit 202 generates an L3 packet which encapsulates the L2 frame. The L3 packet comprises an L3 header, a payload comprising the L2 frame, and metadata specifying a placeholder session identifier for the L2 frame. The L3 header specifies a source IP address and a source port of router 110, a destination IP address and a destination port of a next-hop router toward client device 100B (e.g., router 110B of FIG. 1), and a network protocol. In some examples, control unit 202 identifies the destination IP address and destination port of the next-hop router by retrieving the destination IP address and destination port of the next-hop router from RIB 206.

In some examples, control unit 202 identifies an L3 network service associated with the L2 frame, and selects the network protocol of the L3 header based on the identified L3 network service associated with the L2 frame from a plurality of network protocols. For example, control unit 202 may select a UDP protocol for the L3 header based on the identified L3 network service associated with the L2 frame. In some examples, the L3 packet is a UDP packet and the network protocol is UDP. In other examples, the L3 packet is a TCP packet and the network protocol is TCP.

Control unit 202 generates a "placeholder" session identifier for the L3 packet generated to encapsulate the L2 frame. The placeholder session identifier of the metadata of the L3 packet may comprise, for example, a 5-tuple comprising a placeholder source IP address, a placeholder source port, a placeholder destination IP address, a placeholder destination port, and a first network protocol. In some examples, the placeholder source IP address is an IP address of a LAN interface with which PFE 222 of router 110 receives the L2 frame and the placeholder source port is a port of the LAN interface with which PFE 222 of router 110 receives the L2 frame. In some examples, the placeholder destination IP address is an IP address of a LAN interface of a next-hop router 110 (e.g., router 110B) to which control unit 202 forwards the L3 packet and the placeholder destination port is a port of the LAN interface of the next-hop router 110 (e.g., router 110B) to which control unit 202 forwards the L3 packet. In some examples, the network protocol of the placeholder session identifier is UDP, TCP, or other communication session protocol. Control unit 202 forwards, via IFCs 226 and to the next-hop router (e.g., router 110B), the L3 packet encapsulating the L2 frame.

A non-session-based L2 frame does not include the unique session-identifying information that routers 110 use to perform session-based routing techniques. Therefore, routers 110 may use the placeholder session identifier as a fabricated, unique session-identifying 5-tuple so that routers 110 may nevertheless establish a stateful routing session for the non-session-based L2 frame between router 110A and router 110I through intermediate routers 110B-110H even where the L2 frame does not include unique session-identifying information. Typically, the placeholder session identifier is not associated with actual L2 or L3 address information of packets that are being forwarded. For example, because the non-session-based L2 frame does not include the L2 or L3 addressing information for both an originating device and a destination device, the placeholder session identifier generated by control unit 202 for the L2 frame may comprise, for example, a 5-tuple that may not correspond to either the 5-tuple of the L3 packet header or an L3 address translation of the L2 header of the received L2 frame. In other words, unlike a session identifier for a session-based L2 or L3 packet, the placeholder session identifier for the non-session-based L2 frame may not necessarily correspond to an actual address of the source or destination of the L2 frame.

Accordingly, control unit 202 may use the placeholder session identifier to differentiate the L2 frame from other L2 frames such that control unit 202 may perform session-based routing of the L3 packet encapsulating the L2 frame, even where the L2 frame comprises a non-session-based payload. In this example, the placeholder session identifier may represent a unidirectional session for the L3 packet, the unidirectional session comprising a forward flow originating from client device 110A and destined for client device 100B, but not a reverse flow originating from client device 100B and destined for client device 100A. This is in contrast to the typical use of a session identifier that may be used for L2 and/or L3 session-based packets, for which the session identifier identifies a bidirectional session that comprises both the forward flow and the reverse flow.

For example, control unit 202 may receive, via IFCs 226, a second L3 packet originating from router 110I of FIG. 1 which encapsulates a second non-session-based L2 frame. The second non-session-based L2 frame may originate from client device 110B and be destined for client 110A. For example, where the non-session-based L2 frame received from client device 110A comprises an ARP request, the second non-session-based L2 frame may comprise a response to the ARP request. However, the second L3 packet originating from router 110I may comprise metadata specifying a placeholder session identifier that is different than the placeholder session identifier specified by the metadata of the L3 packet generated by control unit 202 to encapsulate the non-session-based L2 frame received from client device 110A. Thus, the placeholder session identifier of the L3 packet generated by control unit 202 may specify a first unidirectional session comprising a forward packet flow originating from, e.g., router 110A and destined for router 110I and not a reverse packet flow originating from router 110I and destined for router 110A. Further, the placeholder session identifier of the second L3 packet originating from router 110I may specify a second unidirectional session comprising the reverse packet flow originating from, e.g., router 110I and destined for router 110A but not the forward packet flow originating from router 110A and destined for router 110I.

In some examples, the L2 frame received from client device 100A is a first L2 frame of a plurality of L2 frames. In response to receiving the L2 frame, control unit 202 may generate the placeholder session identifier as described above and store the placeholder session identifier in session information 235. For subsequent L2 frames, control unit 202 may determine, based on the L2 header of the subsequent L2 frames, that the subsequent L2 frames include the same combination of originating client device 100A and/or destination client device 100B as the first L2 frame. Control unit 202 may therefore include the same metadata specifying the placeholder session identifier, and forward the subsequent L3 packets toward the same next-hop router 110. Subsequent routers 110 may receive the subsequent L3 packets and use the placeholder session identifier to perform session-based routing of the subsequent L3 packets. Control unit 202 may delete, from session information 235, the placeholder session identifier for the L2 frame after a predetermined amount of time. For example, control unit 202 may delete, from session information 235, the placeholder session identifier for the L2 frame after the placeholder session identifier for the L2 frame is not used for a predetermined amount of time. In this fashion, control unit 202 may use the placeholder session identifier ensuring that non-session-based L2 frames including the same combination of originating client device 100A and/or destination client device 100B is forwarded along the same path (e.g., to the same next-hop router 110) such that routers 110 may perform L3 session-based routing of the L2 frame (encapsulated by the L3 packet) across L3 service provider networks 150 and apply stateful routing services to the L2 frame.

With reference to FIG. 1, in the following example, router 110 operates as router 110I and receives an L3 packet encapsulating a non-session-based L2 frame as described above from router 110H. As described above, because routers 110 of FIG. 1 perform session-based routing, each router 110 replaces the L3 header with a source IP address and a source port of the current router 110 and a destination IP address and a destination port of the next-hop router 110. For example, router 110B may replace the L3 header of the L3 packet with a new L3 header that specifies a source IP address and a source port of router 110B and a destination IP address and destination port of router 110C before forwarding the L3 packet to router 110C. Router 110C, in turn, may replace the L3 header of the L3 packet with yet another new L3 header that specifies a source IP address and a source port of router 110C and a destination IP address and destination port of router 110D before forwarding the L3 packet to router 110D, and so on, until router 110I receives the L3 packet. Router 110I decapsulates the L3 packet so as to recover the L2 frame from the payload of the L3 packet. Router 110I may thereafter forward, via L2 customer network 140B, the recovered L2 frame to client device 100B.

In some examples, control unit 202 may receive, via IFCs 226, a second L2 frame originating from client 100B and destined for client 100A. For example, where the non-session-based L2 frame received from client device 110A comprises an ARP request, the second non-session-based L2 frame may comprise a response to the ARP request. Control unit 202 may generate a second L3 packet that encapsulates the second L2 frame. The second L3 packet may further include a second L3 header, a payload comprising the L2 frame, and metadata comprising a second placeholder session identifier. The second L3 header comprises a 5-tuple that specifies a source IP address and a source port of router 110, a destination IP address and a destination port of a next-hop router toward client device 100A (e.g., router 110H of FIG. 1), and a network protocol. In some examples, control unit 202 identifies the destination IP address and destination port of the next-hop router by retrieving the destination IP address and destination port of the next-hop router from RIB 206.

In a similar fashion as described above, control unit 202 determines whether the L2 frame comprises a non-session-based payload, and in response, generates a second placeholder session identifier for the second L3 packet generated to encapsulate the second L2 frame. The second placeholder session identifier comprises a 5-tuple comprising a placeholder source IP address, a placeholder source port, a placeholder destination IP address, a placeholder destination port, and a first network protocol. Because, as discussed above, the 5-tuple of the second placeholder session identifier may be based on a LAN interface and port on which control unit 202 receives the second L2 frame and the LAN interface and port of the next-hop router 110 (e.g., router 110H) to which control unit 202 forwards the L3 packet, the second placeholder session identifier may be different than the placeholder session identifier used in the L3 header of the L3 packet encapsulating the L2 frame received by router 110A from client 100A. Thus, the placeholder session identifier of the L3 packet generated by router 110A of FIG. 1 to encapsulate the L2 frame received from client device 100A may specify a first unidirectional session comprising a forward packet flow originating from router 110A and destined for router 110I and not a reverse packet flow originating from router 110I and destined for router 110A. In contrast, the second placeholder session identifier of the second L3 packet originating from router 110I and destined for router 110A may specify a second unidirectional session comprising the reverse packet flow originating from router 110I and destined for router 110A but not the forward packet flow originating from router 110A and destined for router 110I.

In some examples, control unit 202 may apply one or more stateful services to the L3 packet prior to forwarding the L3 packet toward a next-hop or prior to decapsulating the L3 packet to obtain the L2 frame. In some examples, the stateful services may include, e.g., Deep Packet Inspection (DPI).

Figure 3A:
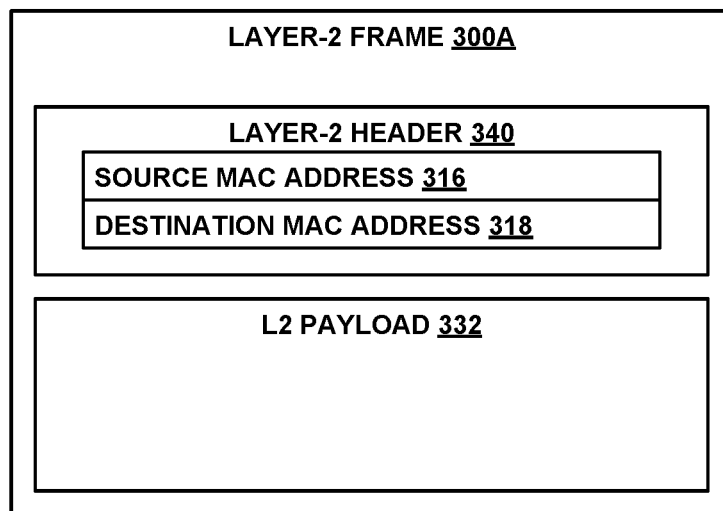
FIGS. 3A-3B are block diagrams illustrating a data structure for an L2 frame and a data structure for an L3 packet generated from the L2 frame in accordance with the techniques of the disclosure.
Figure 3B:
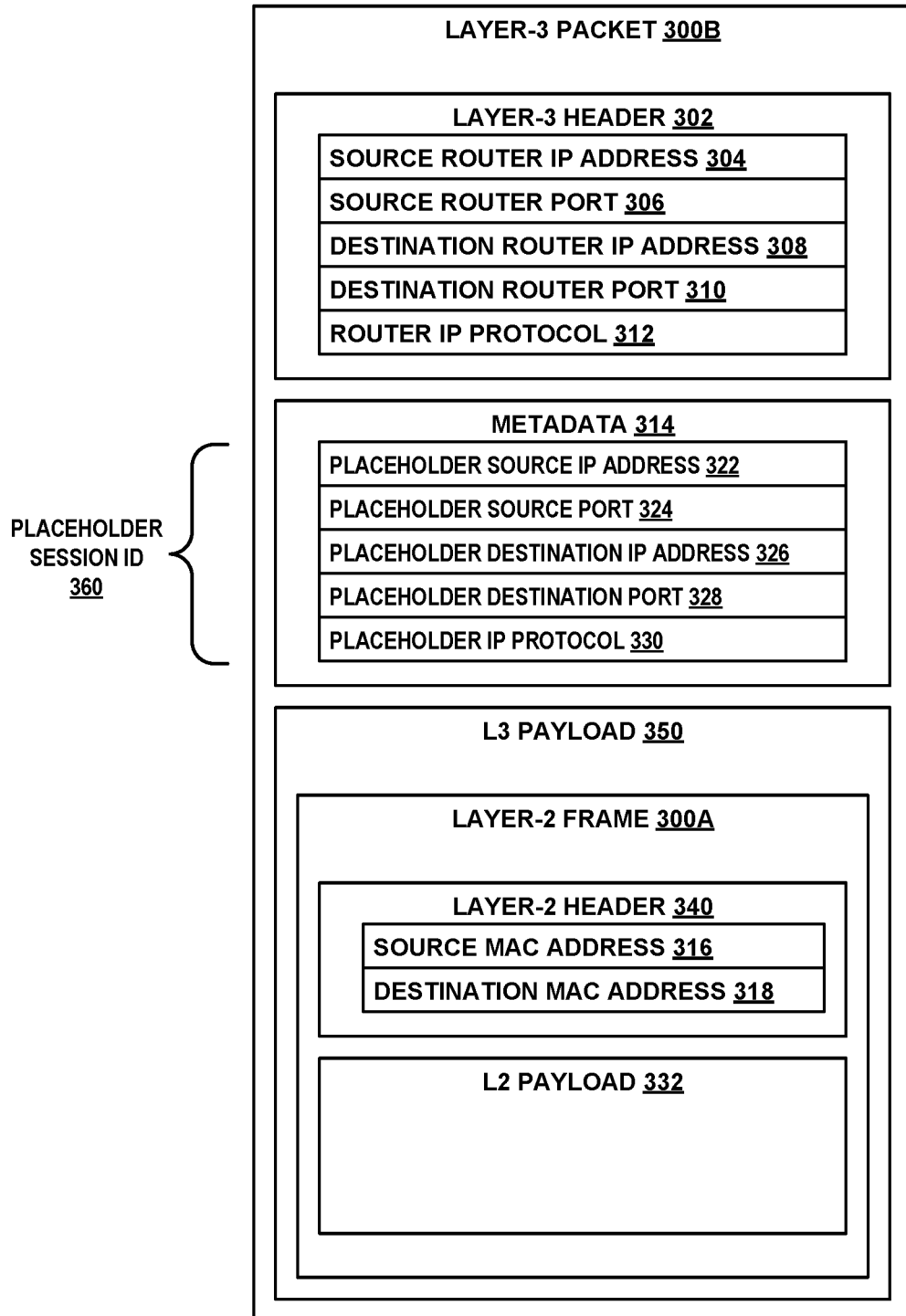

FIGS. 3A-3B are block diagrams illustrating a data structure for an L2 frame and a data structure for an L3 packet generated from the L2 frame in accordance with the techniques of the disclosure. FIGS. 3A-3B are described with respect to FIG. 1 for convenience.

FIG. 3A is a block diagram illustrating a data structure for L2 frame 300A. In some examples, L2 frame 300A comprises an Ethernet frame. L2 frame 300A includes L2 header 340 and data payload 332. In some examples, L2 header 340 specifies source MAC address 316 indicative of a device originating L2 frame 300A and destination MAC address 318 indicative of a device to which L2 frame 300A is destined.

In the example of FIG. 3A, data payload 332 comprises a non-session-based payload. In some examples, the non-session-based payload of the L2 frame comprises an ARP request, a CDP request, or an LLDP request. In some examples, the L2 frame comprises an Ethernet frame.

In some examples where L2 frame 300A is an Ethernet frame, L2 frame 300A may additionally include a preamble, an EtherType, and a frame check sequence (not depicted in FIG. 3A). In some examples, L2 header 340 includes an IEEE 802.1Q VLAN tag that specifies a VLAN to which L2 frame 300A belongs. In some examples, L2 header 340 includes an IEEE 802.1ad Q-in-Q tag that specifies multiple "stacked" VLANs to which L2 frame 300A belongs.

As described above with reference to FIG. 1, in some examples, router 110A receives L2 frame 300A from client device 100A. In this example, source MAC address 316 specifies a MAC address of client device 100A and destination MAC address 318 specifies client device 100B.

L2 frame 300A is depicted for illustrative purposes only. The techniques of the disclosure may apply to other types of L2 frames that use different formats than the format depicted in FIG. 3A. For example, an ARP request may be used to query an unknown MAC address for, e.g., client device 100B. In such an example, L2 frame 300A may not include destination MAC address 318 because such information may not be known.

FIG. 3B is a block diagram illustrating a data structure for L3 packet 300B generated from non-session-based L2 frame 300A in accordance with the techniques of the disclosure. L3 packet 300B includes L3 header 302, metadata 314, and L3 data payload 350. L3 data payload 350 comprises L2 frame 300A of FIG. 3A such that L3 packet 300B encapsulates L2 frame 300A.

L3 header 302 specifies source router IP address 304 indicative of a device originating L3 packet 300B, source port 306 indicative of a port of the originating device from which L3 packet 300B egresses, destination router IP address 308 indicative of a device to which L3 packet 300B is destined, destination port 310 indicative of a port of destination device to which L3 packet 300B is destined, and router IP protocol 312, which specifies a protocol used by L3 packet 300B. In some examples, router IP protocol 312 specifies one of TCP or UDP.

As described above with reference to FIG. 1, in some examples, router 110A generates L3 packet 300B in response to receiving non-session-based L2 frame 300A. In this example, source router IP address 304 and source port 306 specify an IP address of router 110A and port used by router 110A to forward L3 packet 300B, respectively. Destination router IP address 308 and destination port 310 specify an IP address and port of router 110B to which L3 packet 300B is destined, respectively.

Metadata 314 specifies placeholder session identifier 360, which comprises placeholder source IP address 322, placeholder source port 324, placeholder destination IP address 326, placeholder destination port 328, and placeholder IP protocol 330. In some examples, placeholder source IP address 322 is an IP address of a LAN interface with which router 110A of FIG. 1 receives L2 frame 300A and placeholder source port 324 is a port of the LAN interface with which router 110A receives L2 frame 300A. In some examples, placeholder destination IP address 326 is an IP address of a LAN interface of a next-hop router 110 (e.g., router 110B) to which router 110A forwards L3 packet 300B and placeholder destination port 328 is a port of the LAN interface of the next-hop router 110 (e.g., router 110B) to which router 110A forwards L3 packet 300B. In some examples, placeholder network protocol 330 is UDP. In other examples, placeholder network protocol 330 is TCP. As described above, routers 110 of FIG. 1 may use placeholder session identifier 360 to perform session-based routing of L2 frame 300A and/or L3 packet 300B, even where L2 frame 300A is a non-session-based L2 frame that comprises non-session-based payload 332.

Figure 4:
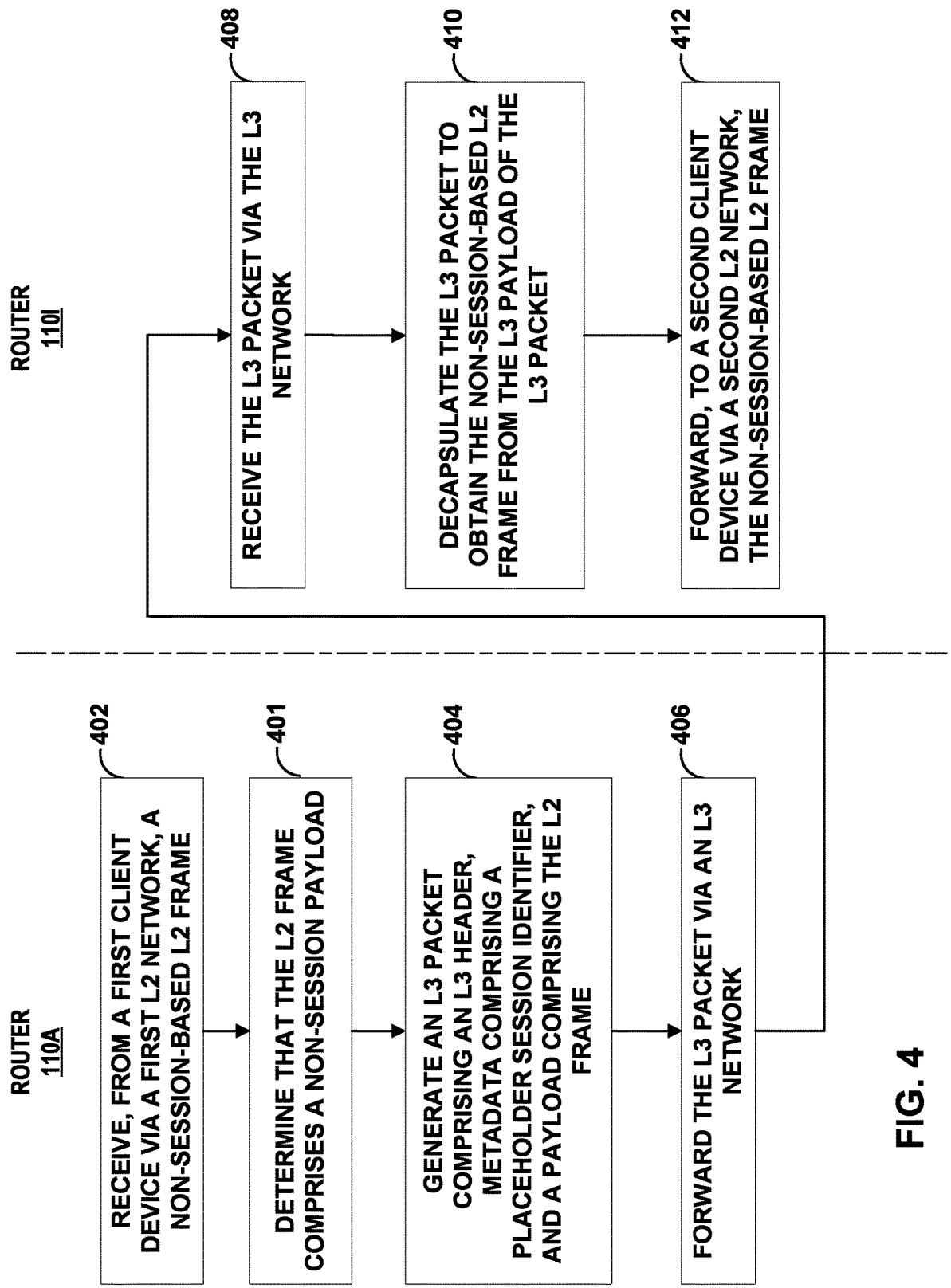
FIG. 4 is a flowchart illustrating an example operation in accordance with the techniques of the disclosure.

FIG. 4 is a flowchart illustrating an example operation in accordance with the techniques of the disclosure. FIG. 4 is described with respect to FIG. 1 for convenience.

Router 110A receives, from client device 100A, an L2 frame destined for client device 100B (402). An L2 network, such as customer network 140A, connects client device 100A to router 110A. The L2 frame comprises a payload and an L2 header.

Router 110A determines that the L2 frame comprises a non-session-based payload (401). In some examples, the non-session-based payload of the L2 frame comprises an ARP request, a CDP request, or an LLDP request. In some examples, the L2 frame comprises an Ethernet frame.

In response to determining that the L2 frame comprises the non-session-based payload, router 110A generates an L3 packet comprising an L3 header, metadata comprising a placeholder session identifier, and an L3 payload comprising the non-session-based L2 frame so as to encapsulate the L2 frame with the L3 packet (404). For example, router 110A identifies, based on the L2 header of the L2 frame, an L3 network service associated with the L2 frame. The L3 header of the L3 packet specifies a source IP address and a source port of router 110A and a destination IP address and destination port of router 110B (e.g., a next-hop router). The L3 header further includes a network protocol selected based on the identified L3 network service associated with the L2 frame. In some examples, the network protocol is UDP. In some examples, the network protocol is TCP.

Further, the placeholder session identifier of the metadata of the L3 packet may comprise, for example, a 5-tuple comprising a placeholder source IP address, a placeholder source port, a placeholder destination IP address, a placeholder destination port, and a first network protocol. In some examples, the placeholder source IP address is an IP address of a LAN interface with which router 110A receives the L2 frame and the placeholder source port is a port of the LAN interface with which router 110A receives the L2 frame. In some examples, the placeholder destination IP address is an IP address of a LAN interface of a next-hop router 110 (e.g., router 110B) to which router 110A forwards the L3 packet and the placeholder destination port is a port of the LAN interface of the next-hop router 110 (e.g., router 110B) to which router 110A forwards the L3 packet. In some examples, the network protocol is UDP. In other examples, the network protocol is TCP.

Router 110A forwards the L3 packet toward router 110I via L3 service provider networks 150 (406). For example, router 110A forwards the L3 packet to router 110B. As described above, router 110B may replace the L3 header of the L3 packet with a new L3 header that specifies a source IP address and a source port of router 110B and a destination IP address and destination port of router 110C before forwarding the L3 packet to router 110C. Router 110C, in turn, may replace the L3 header of the L3 packet with yet another new L3 header that specifies a source IP address and a source port of router 110C and a destination IP address and destination port of router 110D before forwarding the L3 packet to router 110D.

Eventually, router 110I receives the L3 packet from, e.g., router 110H (408). In response to receiving the L3 packet, router 110I decapsulates the L3 packet to obtain the non-session-based L2 frame from the L3 payload of the L3 packet. (410). Router 110I forwards, to client device 100B, the recovered L2 frame destined for client device 100B via another L2 network, such as customer network 140B, which connects router 110I to client device 100B (412).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a first router via an Open Systems Interconnection (OSI) Model Layer-2 (L2) network, an L2 frame, the L2 frame comprising a non-session-based payload;
generating, by the first router and in response to determining the L2 frame comprises the non-session-based payload, a placeholder session identifier for the L2 frame;
forming, by the first router, an OSI Model Layer-3 (L3) packet comprising:
an L3 header;
a payload comprising the L2 frame; and
metadata comprising the placeholder session identifier; and
performing, by the first router and based on the placeholder session identifier, L3 session-based routing of the L3 packet to forward the L3 packet via an L3 network to a second router.

2. The method of claim 1,
wherein the L3 header specifies a network protocol,
wherein the method further comprises identifying, by the first router, an L3 network service associated with the L2 frame,
wherein forming the L3 packet comprises selecting the network protocol from a plurality of network protocols based on the identified L3 network service associated with the L2 frame.

3. The method of claim 1, wherein generating the placeholder session identifier for the L2 frame is based on L2 information specified by an L2 header of the L2 frame.

4. The method of claim 1, wherein the placeholder session identifier comprises a placeholder source IP address, a placeholder source port, a placeholder destination IP address, a placeholder destination port, and a network protocol.

5. The method of claim 1, wherein the placeholder session identifier comprises a 5-tuple of placeholder L3 address information that does not correspond to an L3 address translation of an L2 header of the L2 frame.

6. The method of claim 1,
wherein the L3 header comprises a first 5-tuple of L3 address information, and
wherein the placeholder session identifier comprises a second 5-tuple of placeholder L3 address information that is different than the first 5-tuple of L3 address information of the L3 header.

7. The method of claim 1, wherein the non-session-based payload comprises one of an Address Resolution Protocol (ARP) request, a Cisco Discovery Protocol (CDP) request, or a Link Layer Discovery Protocol (LLDP) request.

8. The method of claim 1,
wherein the L3 packet comprises at least one of a User Datagram Protocol (UDP) packet or a Transmission Control Protocol (TCP) packet, and
wherein the L2 frame comprises an Ethernet frame.

9. The method of claim 1, further comprising:
storing, by the first router, the placeholder session identifier for the L2 frame; and
deleting, by the first router and after expiration of a predetermined amount of time, the placeholder session identifier for the L2 frame.

10. The method of claim 1, wherein the placeholder session identifier distinctly identifies the L2 frame from other L2 frames received by the first router.

11. A first router configured to:
receive, via an Open Systems Interconnection (OSI) Model Layer-2 (L2) network, an L2 frame, the L2 frame comprising a non-session-based payload;
generate, in response to determining the L2 frame comprises the non-session-based payload, a placeholder session identifier for the L2 frame;
form an OSI Model Layer-3 (L3) packet comprising:
an L3 header;
a payload comprising the L2 frame; and
metadata comprising the placeholder session identifier; and
perform, based on the placeholder session identifier, L3 session-based routing of the L3 packet to forward the L3 packet via an L3 network to a second router.

12. The first router of claim 11,
wherein the L3 header specifies a network protocol,
wherein the first router is further configured to identify an L3 network service associated with the L2 frame,
wherein to form the L3 packet, the first router is configured to select the network protocol from a plurality of network protocols based on the identified L3 network service associated with the L2 frame.

13. The first router of claim 11, further configured to generate the placeholder session identifier for the L2 frame based on L2 information specified by an L2 header of the L2 frame.

14. The first router of claim 11, wherein the placeholder session identifier comprises a placeholder source IP address, a placeholder source port, a placeholder destination IP address, a placeholder destination port, and a network protocol.

15. The first router of claim 11, wherein the placeholder session identifier comprises a 5-tuple of placeholder L3 address information that does not correspond to an L3 address translation of an L2 header of the L2 frame.

16. The first router of claim 11,
wherein the L3 header comprises a first 5-tuple of L3 address information, and
wherein the placeholder session identifier comprises a second 5-tuple of placeholder L3 address information that is different than the first 5-tuple of L3 address information of the L3 header.

17. The first router of claim 11, wherein the non-session-based payload comprises one of an Address Resolution Protocol (ARP) request, a Cisco Discovery Protocol (CDP) request, or a Link Layer Discovery Protocol (LLDP) request.

18. The first router of claim 11,
wherein the L3 packet comprises at least one of a User Datagram Protocol (UDP) packet or a Transmission Control Protocol (TCP) packet, and
wherein the L2 frame comprises an Ethernet frame.

19. The first router of claim 11, further configured to:
store the placeholder session identifier for the L2 frame; and
delete, after expiration of a predetermined amount of time, the placeholder session identifier for the L2 frame.

20. A non-transitory, computer-readable medium comprising instructions that, when executed, are configured to cause processing circuitry of a first router to:
receive, via an Open Systems Interconnection (OSI) Model Layer-2 (L2) network, an L2 frame, the L2 frame comprising a non-session-based payload;
generate, in response to determining the L2 frame comprises the non-session-based payload, a placeholder session identifier for the L2 frame;
form an OSI Model Layer-3 (L3) packet comprising:
an L3 header;
a payload comprising the L2 frame; and
metadata comprising the placeholder session identifier; and
perform, based on the placeholder session identifier, L3 session-based routing of the L3 packet to forward the L3 packet via an L3 network to a second router.

* * * * *